DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 19, 1972

905 O.G. 454

T905,010

COMPOSITE OF POLYETHYLENE OR POLYPROPYLENE, AN AMORPHOUS ETHYLENE-PROPYLENE COPOLYMER, AND A FIBROUS ALKALI METAL TITANATE

Richard Frederick Regester, Havertown, Pa., assignor to E. I. du Pont de Nemours and Company, Wilmington, Del.

Filed Feb. 22, 1972, Ser. No. 228,245
Int. Cl. C08f *45/10*
U.S. Cl. 260—41 B
No Drawing. 9 Pages Specification

A composite is provided of a blend of an ethylene or propylene polymer, a substantially amorphous ethylene/propylene copolymer, and a fibrous alkali metal titanate. The combination of copolymer and titanate additives serves to improve the impact strength of the base polyethylene or polypropylene while also improving modulus and heat distortion properties. The composites may be injection molded. They are particularly advantageous when used for metal plating purposes.